US011117840B1

(12) United States Patent
Merritt (10) Patent No.: US 11,117,840 B1
(45) Date of Patent: Sep. 14, 2021

(54) PROCESS FOR MAKING A SEMI-SOLUBLE GRANULE COMPRISING ROCK PHOSPHATE AND HUMIC ACID (71) Applicant: Kevin Merritt, St. Augustine, FL (US)

(72) Inventor: Kevin Merritt, St. Augustine, FL (US)

(*) Notice: Subject to any disclaimer, the term of this patent is extended or adjusted under 35 U.S.C. 154(b) by 23 days.

(21) Appl. No.: 16/210,646

(22) Filed: Dec. 5, 2018

Related U.S. Application Data (63) Continuation-in-part of application No. 15/878,773, filed on Jan. 24, 2018, now Pat. No. 10,597,337, which is a continuation-in-part of application No. 14/738,865, filed on Jun. 13, 2015, now Pat. No. 9,914,670.

(60) Provisional application No. 62/013,789, filed on Jun. 18, 2014.

(51) Int. Cl.
C05B 17/00 (2006.01)
C05F 11/08 (2006.01)
C05F 11/02 (2006.01)
C05B 19/00 (2006.01)

(52) U.S. Cl.
CPC ............. C05B 17/00 (2013.01); C05B 19/00 (2013.01); C05F 11/02 (2013.01); C05F 11/08 (2013.01)

(58) Field of Classification Search
CPC ......... C05B 17/00; C05B 19/00; C05F 11/08; C05F 11/02
See application file for complete search history.

(56) References Cited

U.S. PATENT DOCUMENTS

| 2,992,093 | A | | 7/1961 | Burdick |
| 3,700,728 | A | | 10/1972 | Moschopedis et al. |
| 3,932,166 | A | | 1/1976 | Vignovich et al. |
| 4,015,972 | A | | 4/1977 | Watkins et al. |
| 4,459,149 | A | * | 7/1984 | Moran .................. C08H 99/00 44/490 |
| 5,026,416 | A | | 6/1991 | Alexander |
| 5,034,045 | A | | 7/1991 | Alexander |
| 5,876,479 | A | | 3/1999 | Hedgpeth |
| 6,783,567 | B1 | | 8/2004 | Waters |
| 8,388,722 | B2 | | 3/2013 | Lynch et al. |
| 9,914,670 | B1 | | 3/2018 | Merritt |

(Continued)

FOREIGN PATENT DOCUMENTS

| CN | 1026095 C | * | 10/1994 |
| CN | 1026095 C | | 10/1994 |

(Continued)

OTHER PUBLICATIONS

Jacob, Kenneth Donald, et al. The composition and distribution of phosphate rock with special reference to the United States. No. 1488-2016-124804. 1933.*

(Continued)

Primary Examiner — Jennifer A Smith
(74) Attorney, Agent, or Firm — Middleton Reutlinger (57) ABSTRACT A semi-soluble composite granule may include a homogenous powder including a rock phosphate powder making up about 1.0% to about 99% of the homogenous powder and a hydrolyzed humic acid enriched powder making up about 0.05% to about 25% of the homogenous powder; where the homogenous powder is granulated to form a semi-soluble composite granule; and where the composite granule is between about 0.8 mm and about 4.0 mm in diameter.

15 Claims, 2 Drawing Sheets

(56) References Cited

U.S. PATENT DOCUMENTS

| | | | |
|---|---|---|---|
| 10,597,337 B1 | | 3/2020 | Merritt |
| 10,723,667 B1 | | 7/2020 | Merritt |
| 2005/0039509 A1* | | 2/2005 | Muma ............... C05B 17/00 71/24 |
| 2008/0216534 A1 | | 9/2008 | Karr |
| 2011/0259067 A1 | | 10/2011 | Lynch |
| 2013/0239633 A1* | | 9/2013 | Halos ............... A61P 31/04 71/7 |
| 2016/0200634 A1* | | 7/2016 | Zaseybida ........... C05B 17/00 71/6 |
| 2016/0229761 A1 | | 8/2016 | Cherry et al. |
| 2017/0334795 A1 | | 11/2017 | Cherry et al. |
| 2018/0311712 A1 | | 11/2018 | Le |
| 2020/0148952 A1 | | 5/2020 | Merritt |
| 2020/0270183 A1 | | 8/2020 | Merritt |

FOREIGN PATENT DOCUMENTS

| | | | |
|---|---|---|---|
| CN | 101024590 B | | 11/2010 |
| CN | 101905983 A | * | 12/2010 |
| CN | 101905983 A | | 12/2010 |
| CN | 202148263 U | | 2/2012 |
| CN | 101768019 B | | 12/2012 |
| CN | 102898254 A | | 1/2013 |
| CN | 102942417 A | | 2/2013 |
| CN | 101935243 B | | 7/2013 |
| CN | 102875248 B | | 10/2014 |
| CN | 104892296 A | * | 9/2015 |
| CN | 104892296 A | | 9/2015 |
| EP | 1216976 A2 | | 6/2002 |
| IN | 02359CH2010 | | 9/2010 |
| RU | 2443663 C1 | | 2/2012 |
| RU | 2491266 C1 | | 1/2013 |
| WO | 9533702 A1 | | 12/1995 |
| WO | 2010094985 A1 | | 8/2010 |
| WO | 2013057168 A2 | | 4/2013 |

OTHER PUBLICATIONS

Wang et al., Evaluation of Methods of Determining Humic Acids in Nucleic Acid Samples for Molecular Biological Analysis, Biosci. Biotechnol. Biochem., 75(2), 355-357, 2011.

AGN Microbial Selection and Sub-Profiling, Cisbay, www.cisbay.com.

Van Zomeren, Measurement of Humic and Fulvic Acid Concentrations and Dissolution Properties by a Rapid Batch Procedure, Environ. Sci. Technol., 41 (19), pp. 6755-6761, 2007.

Babalola, Beneficial bacteria of agricultural importance, Biotechnol Lett, 32, 1559-1570, 2010.

Comans et al., Concentrations of total dissolved organic carbon and humic and hydrophilic sub-fractions extracted from major Dutch soil types and their relation with soil properties, Geophysical Research Abstractsvol. 15, EGU2013-13841, 2013.

Grow More; Humic/Fulvic Acids, pp. 1-7, Dec. 31, 2003.

Halliday, The relationship between Humalite, Leonardite, and Fertilizers, Black Earth, 2015.

Humic Growth Solutions; Diamond-Grow Organic 100% Water Soluble Spray Dried Humic Acid Powder, pp. 1-2, Jacksonville, FL Dec. 31, 2013.

Topp, Bacteria in agricultural soils: Diversity, role and future perspectives, Canadian Journal of Soil Science, 83, 303-309, 2003.

Javanshah et al., Determination of Humic Acid by Spectrophotometric Analysis in the Soils, International Journal of Advanced Biotechnology and Research (IJBR), vol. 7, pp. 19-23, Special Issue—Apr. 2016.

Lamar et al., A New Standardized Method for Quantification of Humic and Fulvic Acids in Humic Ores and Commercial Products,Journal of AOAC International, 97, 721-730, 2014.

Mineral Logic, LLC, Bioactive Fulvic, Testing Method, Natural Organic Matter Research, 2017.

Myneni, Functional Group Chemistry of Humic Substances, Molecular Environmental Geochemistry Group, The Department of Geosciences, Princeton University, Guyot Hall Princeton, NJ 08544.

Hiroyuki, Interactions of Methylotrophs with Plants and Other Heterotrophic Bacteria, Microorganisms 2015, 3, 137-151; doi: 10.3390/microorganisms3020137, www.mdpi.com/journal/microorganisms, Apr. 2, 2015.

Saint Humic Acid "Potassium humate technical data sheet" <https://www2.slideshare.net/SAINTHUMICACID/potassium-humate-technical-data-sheet-81883698> Nov. 11, 2017 (Year: 2017).

IPCO "Rotoform pastillation for sulphur bentonite" <https://ipco.com/wp-content/uploads/2018/03/IPCO_JP_Sulphur-Bentonite_2018.pdf> Mar. 2018 (Year: 2018).

Canadian Patent Application 3,070,820 filed Feb. 4, 2020 titled Potassium Humate Sulfur Compound Granule.

Mexican Patent Application MX/A/2020/001397 filed Feb. 4, 2020 titled Potassium Humate Sulfur Compound Granule.

Canadian Patent Application 3,077,954 filed Apr. 15, 2020 titled Process for Making a Composite Granule With Rock Phosphate, Sulfur, and Humic Acid.

Mexican Patent Applicantion MX/A/2020/004003 filed Apr. 20, 2020 titled Process for Making a Composite Granule With Rock Phosphate, Sulfur, and Humic Acid.

Baloach, et al. "Integrated effect of phosphate solubilizing bacteria and humic acid on physiomorphic attributes of maize." International Journal of Current Microbiology and Applied Sciences 3.6 (2014): 549-554.

Sharma, A. K., Seema Wahab, and Rashmi Srivastava, eds. Agriculture diversification: problems and perspectives. IK International PVT Ltd, 2010.

Environmental Fertilisers. "EF Soluble Humate Granules". pp. 1-2. <http://environmentalfertilisers.co.nz/ef-soluble-humate-granules/ > Jun. 21, 2013.

Wikipedia. "Potassium humate". <https://en.wikipedia.org/wiki/Potassium_humate> Mar. 7, 2013.

The Andersons. Products—Andersons Humates | Humic DG. <https://andersonshumates.com/products/ > May 21, 2013.

Humic DG Product Label, 2016.

Degryse, Fien, et al. "Uptake of elemental or sulfate-S from fall-or spring-applied co-granulated fertilizer by corn—A stable isotope and modeling study." Field crops research 221 (2018): 322-332.

Lindenmayer, R. "Zinc Fertilization: A Review of Scientific Literature." (2007).

U.S. Appl. No. 16/814,539, filed Mar. 10, 2020 titled Process for Making a Fully Water-Soluble Granule comprising Humic Acid and a Microbial Community Composition.

U.S. Appl. No. 16/924,856, filed Jul. 9, 2020 titled Potassium Humate Zinc Sulfate Compound.

U.S. Appl. No. 17/206,053, filed Mar. 18, 2021 titled Process for Making a Semi-Soluble Humic Granule.

United States Patent Office, Final Office Action in U.S. Appl. No. 16/266,749 dated Apr. 5, 2021.

Huey, Lee J., Osumanu H. Ahmed, and Nik Ma Majid. "Effects of Extractants on the Yields and Selected Chemical Characteristics of Humic Acids Isolated from Tropical Saprists Peat." American Journal of Applied Sciences 7.7 (2010): 933. (Year: 2010).

United States Patent Office, Non-Final Office Action in U.S. Appl. No. 16/814,539 dated Jul. 26, 2021.

Granular Myco (GreenGro Biological) <https:/www.thegreengro.com/product/granular-myco/> Oct. 23, 2017 (Year: 2017).

Premium Ultrafine (GreenGro Biological) <https://www.thegreengro.com/product/premium-ultrafine/> 2017 (Year: 2017).

Maxwell. "HumiMax" <https://d2j31icv6dlhz6.cloudfront.net/O/16EACbqUqFlemViO7sUS/maxwell-humimax-leaflet-2019.pdf> 2019 (Year: 2019).

Fulton, John and Kaylee Port. "Physical properties of granular fertilizers and impact on spreading." Ohio State University, FABE-550.1 (2016). (Year: 2016).

* cited by examiner

PROCESS FOR MAKING A SEMI-SOLUBLE GRANULE COMPRISING ROCK PHOSPHATE AND HUMIC ACID

FIELD OF THE INVENTION

A process such as is described in various embodiments herein relates to a process for making a semi-soluble granule comprising rock phosphate, humic acid, and a dormant microbial community composition. Such a granule is useful as an organic aid to crop growth.

BACKGROUND OF THE INVENTION

Extraction of humic acid and related materials from carbonaceous raw materials (e.g. Humalite, Leonardite, Sub-Bituminous Coal, Menefee, Peat, and the like) has been practiced for years and is accordingly known in the art. Process steps vary, but the process output is generally a particulate material with suboptimal solubility in water.

Furthermore, the benefits of phosphorus in agriculture and/or on plant growth are also well documented, as phosphorus plays a role in a number of important cellular functions of plants, including but not limited to, photosynthesis, respiration, energy storage and transfer, etc. Phosphates are critical to DNA and RNA, and are additionally a component of adenosine triphosphate (ATP) which is the "energy unit" of plants. In some instances, rock phosphate, also known as phosphorite or phosphate rock, is a non-detrital sedimentary rock with large amounts of phosphate minerals may be used as a source of phosphorous for plants.

It is known that microbial organisms provide a wide array of beneficial ecosystem services, especially with respect to plant growth and nutrient availability. In particular, it is known that certain bacteria (e.g. plant growth-promoting rhizobacteria) are of agricultural importance for promoting plant growth, suppression of disease-causing organisms, and beneficially altering nutrient availability in the soil. Furthermore, it is known that the combination of humic acid and microbial organisms may provide a broad range of benefits to the soil. Conventionally, humic acid and microbial organisms are either applied to the soil separately or combined and applied in liquid or soluble powder form. Separate application has the primary disadvantage of requiring an additional application step; whereas, use of a liquid form has the primary disadvantages of being difficult to transport and having a shortened shelf life.

Finally, it is known that zinc is among the micronutrients that plants require to grow efficiently, as, for example, since is an essential component of various enzymes involved in metabolic reactions. Zinc deficiencies may result in a decrease in crop productivity. It is for this reason zinc may be utilized as a part of agricultural fertilizers.

Because organic and other producers typically prefer to apply mixtures that are safe and healthful for both plants and workers, there is a need in the art for a process for making a semi-soluble granule comprising a rock phosphate, humic acid, and a microbial community composition.

SUMMARY OF EMBODIMENTS

The herein-described embodiments address these and other problems associated with the art by providing a semi-soluble composite granule comprised of at least a fully-soluble humic acid powder and a rock phosphate powder, and a method of making the same. In some aspects, a semi-soluble composite granule described herein includes: a homogenous powder comprising a rock phosphate powder comprising about 1.0% to about 99% of the homogenous powder, a hydrolyzed humic acid enriched powder comprising about 0.05% to about 25% of the homogenous powder, and where the homogenous powder is granulated to form a semi-soluble composite granule; and where the composite granule is between about 0.8 mm and about 4.0 mm in diameter.

In some embodiments, the rock phosphate powder comprises: about 15% to about 30% phosphorus pentoxide; about 30% to about 60% calcium carbonate; and about 10% to about 20% silica. In some embodiments, the homogenous powder includes: about 95.85% rock phosphate powder and about 4.15% hydrolyzed humic acid enriched powder.

In some embodiments, homogenous powder further includes a dormant microbial community composition powder comprising about 0.0025% to about 10% of the homogenous powder. In such embodiments, the homogenous powder may include: about 93.75% rock phosphate powder, about 3.75% hydrolyzed humic acid enriched powder, and about 2.5% dormant microbial community composition powder. In some such embodiments, the dormant microbial community composition powder may include at least one methylotrophic microbial species. In other such embodiments, the plurality of dormant microbial organisms may include at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus*, and *Trichoderma*. In still other such embodiments, the dormant microbial community composition powder may include at least one *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata*, and/or *Pseudomonas aeruginosa*. In some such embodiments, the microbial community composition powder may include a lyophilized microbial powder.

In some embodiments, the composite granule is between about 0.8 mm and about 2.0 mm in diameter. In other embodiments, the composite granule is between about 2.0 mm and about 4.0 mm in diameter.

In some embodiments, the homogenous powder further includes a zinc sulfate powder comprising about 0.01% to about 50% of the homogenous powder. In such embodiments, the homogenous powder may include about 95.795% rock phosphate powder, about 4.15% hydrolyzed humic acid enriched powder, about 0.005% dormant microbial community composition powder, and about 0.05% zinc sulfate powder.

In another aspect, a semi-soluble composite granule described herein includes a homogenous powder comprising a rock phosphate powder comprising about 25% to about 95% of the homogenous powder, a hydrolyzed humic acid enriched powder comprising about 3.75% to about 25% of the homogenous powder, and a dormant microbial community composition powder comprising about 0.5% to about 5% of the homogenous powder; where the homogenous powder is granulated to form a semi-soluble composite granule; and where the composite granule is between about 0.8 mm and about 4.0 mm in diameter.

In yet another aspect, a semi-soluble composite granule described herein includes a homogenous powder comprising a rock phosphate powder comprising about 1% to about 99% of the homogenous powder, a hydrolyzed humic acid enriched powder comprising about 0.05% to about 25% of the homogenous powder, a dormant microbial community composition powder comprising about 0.0025% to about 10% of the homogenous powder, and a zinc sulfate powder comprising about 0.01% to about 50% of the homogenous powder; where the homogenous powder is granulated to form a semi-soluble composite granule; and where the composite granule is between about 0.8 mm and about 4.0 mm in diameter.

In still yet another aspect, a process for making a semi-soluble granule comprising a rock phosphate and humic acid is described herein, the process: obtaining a sample of a carbonaceous substance comprising humic acid and one or more other substances; contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, thereby forming a plurality of humic acid enriched powder particles; combining a rock phosphorous powder and the plurality of humic acid enriched powder particles, thereby forming a powder combination; and compacting at least a portion of the powder combination under conditions where the at least a portion of the powder combination, as a result of the compacting, are made into a form of a granule; thereby making a semi-soluble granule comprising the rock phosphate and humic acid.

In some embodiments, the rock phosphate powder comprises about 1% to about 99% of the powder combination, the plurality of humic acid enriched powder particles comprises about 0.05% to about 25% of the powder combination.

In some embodiments, the compacting is effected by an apparatus comprising a roller compactor. In some such embodiments, the roller compactor maintains a speed of about 8 rpm and wherein the roller compactor exerts a pressure of about 1700 psi. In other such embodiments, the roller compactor does not exceed a temperature of about 130 degrees Fahrenheit.

In some embodiments, the formation of the powder combination further includes combining a microbial community composition with the rock phosphorous powder the plurality of humic acid enriched powder particles. In some such embodiments, the rock phosphate powder comprises about 1% to about 99% of the powder combination, the plurality of humic acid enriched powder particles comprises about 0.05% to about 25% of the powder combination, and microbial community composition comprises about 0.0025% to about 10% of the powder combination.

In some such embodiments, the microbial community composition includes a plurality of microbial species in a dormant state. In other such embodiments, the microbial community composition may include at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus,* and *Trichoderma.* In still other such embodiments, the microbial community composition may include at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata,* and/or *Pseudomonas aeruginosa.* In yet other such embodiments, the microbial community composition may include at least one methylotrophic species.

In some embodiments, the formation of the powder combination further includes combining a zinc sulfate powder with the microbial community composition, the rock phosphorous powder the plurality of humic acid enriched powder particles. In some such embodiments, the rock phosphate powder comprises about 1% to about 99% of the powder combination, the plurality of humic acid enriched powder particles comprises about 0.05% to about 25% of the powder combination, the microbial community composition comprises about 0.0025% to about 10% of the powder combination, and the zinc sulfate powder comprises about 0.01% to about 50% of the powder combination.

In another aspect, a process for making a semi-soluble granule comprising a rock phosphate, humic acid, and a microbial community composition is disclosed herein, the process including: obtaining a sample of a carbonaceous substance comprising humic acid and one or more other substances; contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, thereby forming a plurality of humic acid enriched powder particles; combining a microbial community composition, a rock phosphorous powder, and the plurality of humic acid enriched powder particles, thereby forming a powder combination; and compacting at least a portion of the powder combination under conditions where the at least a portion of the powder combination, as a result of the compacting, are made into a form of a granule; thereby making a semi-soluble granule comprising the rock phosphate, humic acid, and a microbial community composition.

In still another aspect, a process for making a semi-soluble granule comprising a rock phosphate, humic acid, a microbial community composition, and zinc sulfate is disclosed herein, the process including: obtaining a sample of a carbonaceous substance comprising humic acid and one or more other substances; contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, thereby forming a plurality of humic acid enriched powder particles; combining a microbial community composition, a rock phosphorous powder, a zinc sulfate powder, and the plurality of humic acid enriched powder particles, thereby forming a powder combination; and compacting at least a portion of the powder combination under conditions where the at least a portion of the powder combination, as a result of the compacting, are made into a form of a granule; thereby making a semi-soluble granule comprising the rock phosphate, humic acid, and a microbial community composition.

BRIEF DESCRIPTION OF THE FIGURES

FIG. 1A illustrates composite granules ranging from about 2.0 mm to about 2.8 mm in diameter disposed along a ruler. FIG. 1B illustrates composite granules ranging from about 2.8 mm to about 4.0 mm in diameter disposed along a ruler.

FIG. 2A illustrates composite granules ranging from about 2.0 mm to about 2.8 mm in diameter. FIG. 2B illustrates composite granules ranging from about 2.8 mm to about 4.0 mm in diameter. Each of FIGS. 2A-2B include a United States dime for reference, which has a standard diameter of 17.9 mm.

DETAILED DESCRIPTION

A process and composition such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a "semi-soluble granule" refers to a granule that partially dissolves in water under typical conditions of use (e.g. during rainy conditions).

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

When used in this specification and the claims, a "dormant" microbial organism refers to a period in a microbial organism's life cycle when metabolic activity is temporarily slowed. Microbial organisms may enter a dormant state when stressful conditions are encountered, such as exposure to the cold, nutrient depletion or starvation, or the like. Dormancy is a reversible state, from which a microbial organism can exit and return to its typical metabolic activity. As a non-limiting example, some organisms (e.g. members of the genus *Bacillus*) may form (or be induced to form) endospores when entering a dormant state. Endospores are tough, non-reproductive, structures produced by a bacterium that function to aid the organism's survival. In some instances, endospores may be resistant to ultraviolet radiation, lysosomes, extreme temperatures, nutrient depletion, and/or chemical disinfectants. As a further non-limiting example, organisms may be induced into a dormant state through lyophilization. Lyophilization is the process of freeze-dying microbial organisms, which includes culturing the desired microorganism, suspending the culture in an appropriate lyophilization medium or buffer, and subjecting the suspended culture to a lyophilization process. Lyophilized microorganisms may then be rehydrated at a desired time.

Aspects of a process such as is described in various embodiments herein are further illustrated by the following examples, which are set forth to illustrate certain aspects of a process such as is described in various embodiments herein and are not to be construed as limiting thereof.

In an example, production of a semi-soluble composite granule comprising rock phosphate and humic acid may be undertaken as a multi-step process. The first general step comprises blending raw material and an alkaline mixture in a blend tank; screening the blended mixture that was made in the blend tank; drying the liquid derived from screening of the blended mixture, thereby forming a fine powder of enriched, hydrolyzed humic acid. In a second general step, this hydrolyzed humic acid enriched powder is combined with a dormant microbial powder composition and a rock phosphorus powder; this combined powder is then processed to form granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the insoluble sand, clay and humin fraction, also known as sludge. The amount of sludge varied, but typically the sludge was about 5-7% of the total weight of the blended mixture.

In an example, the sludge still possessed some humic content and was given away to local farmers free of charge. The screened humic acid enriched liquid, which had a density of 8.35-9 lb/gallon, was collected in an insulation tank, which had a capacity of 12500 gal. The humic acid enriched liquid was pumped from the insulation tank to a spray dryer firing tank from which it was transferred to a spray dryer.

In an example, a spray dryer system comprised a burner, a dryer, two cyclone separators, a baghouse and a powder hopper. Humic acid enriched liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The humic acid enriched liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a humic acid enriched powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The humic acid enriched powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the humic acid enriched powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

Rock phosphate (also known as phosphorite and phosphate rock) is a non-detrital sedimentary rock that containing phosphate material. The specific phosphate content of rock phosphate may vary widely, for example from about 4% to more than 30% phosphorus pentoxide (P2O5). Rock phosphate may also contain calcium carbonate, iron and/or aluminum oxides, and silica.

In an example, the fine humic acid enriched powder may be homogenized with a rock phosphorous powder in a ribbon blender for such a time so as to obtain a fine, completely homogenous blend of humic acid enriched powder and rock phosphate powder.

In another example, the fine humic acid enriched powder may be homogenized with a dormant microbial community composition powder and a rock phosphate powder in a ribbon blender for such a time so as to obtain a fine, completely homogenous blend of humic acid enriched powder, dormant microbial community composition powder, and rock phosphate powder.

The specific microbial community composition may vary based on the end use of the granule. As a non-limiting example, in some instances in may be desirable to include microbial organisms capable of nitrogen fixation. In other instances, it may be desirable to include microbial organisms capable of solubilizing phosphate. In still other instances, in may be desirable to include organisms capable of bioremediation of the soil. As such, in some circumstances, a commercially available dormant microbial community composition powder may be used; while, in other circumstances, it may be desirable to custom tailor the microbial community composition to the desired end use of the granule. As discussed previously, lyophilization may be used to in order to induce dormancy in the microbial community, microbial community compositions may be lyophilized through use of a shelf lyophilized, a manifold, or any other method of lyophilization known in the art.

In still yet another example, the fine humic acid enriched powder may be homogenized with a rock phosphorous powder, a dormant microbial community composition powder, and a zinc sulfate powder in a ribbon blender for such a time so as to obtain a fine, completely homogenous blend of humic acid enriched powder and rock phosphate powder.

In some instances, zinc deficiencies may be present in up to 50 percent of soils. Zinc deficiencies may be more common when temperatures are lowers, such as in the spring; additionally, zinc deficiencies may be more common in soils with a high sand content. Since zinc is an essential component of many metabolic reactions in plants, zinc is a micronutrient necessary to for plants to grow efficiently. Because of its solubility in water, zinc sulfate may be used as a source of zinc in fertilizers.

In an example, conversion of the fine, completely homogenous powder (humic acid enriched powder and rock phosphate powder and/or dormant microbial community composition powder and/or zinc sulfate powder) to form the semi-soluble composite may be affected by an apparatus comprising a mechanical roller compactor, with pocket rollers at 8 rpm rotation and 1700 psi. Conventionally, the granulation process has required conditions not conducive to the survival of various microorganisms (e.g. high temperatures). In contrast, the process described herein results in the survival of the dormant microbial community composition, such that the organism may be rehydrated and return to typical metabolic activity.

Compacted composite granules were blown out pneumatically and screened by means of a vibratory screener to achieve relative uniformity of size distribution. For example, composite granules of 2.1 mm-4.0 mm were prepared for various agricultural uses, and composite granules of 0.8 mm-2.0 mm were prepared for horticultural use. Resulting composite granules allow for easy transport, as well as application in dry farming systems.

Resulting composite granules are semi-soluble, meaning they partially dissolve in water (e.g. rainwater in dry farming applications) and have been found to aid plant growth in both agricultural and horticultural applications. More specifically, the rock phosphate component of the granule may not be soluble, while humic acid enriched powder component, the microbial community composition component (if present), and the zinc sulfate component (if present) may be fully soluble in water.

The granules described herein may have a number of beneficial effects on the soil. These benefits may include, but are not limited to: an improvement in soil structure; altering the soil biochemistry in order to support microbial activity; allowing for increased water retention and/or availability; increasing the buffering capability and nutrient management capability; providing an available source of phosphoric acid for immediate plant uptake; providing basic mineral elements for plant nutrient availability and uptake; providing elemental and sulfate-based macronutrients and micronutrients for positively influence root zone; managing high soil pH levels; and provide biologically-active spores to enhance the efficient of nitrogen and phosphate use. It is to be understand that aforementioned benefits are merely exemplary. Furthermore, it is also to be understood that every composite granule described herein may not have every exemplary benefit described.

Aspects of a process such as is described in various embodiments herein are further illustrated by the following further examples, which are set forth to illustrate certain aspects of a process such as is described in various embodiments herein and are not to be construed as limiting thereof.

Further example 1. A process for making a semi-soluble granule comprising a rock phosphate and humic acid composition, the process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of humic acid enriched powder particles;

combining a rock phosphorous powder and the plurality of humic acid enriched powder particles, thereby forming a powder combination; and compacting at least a portion of the powder combination under conditions wherein the at least a portion of the powder combination, as a result of the compacting, are made into a form of a granule;

thereby making a semi-soluble granule comprising the rock phosphate and humic acid.

Further example 2. A process according to further example 1, wherein the carbonaceous substance comprises a coal and/or a claystone and/or a mudstone and/or a shale.

Further example 3. A process according to further example 1, wherein the carbonaceous substance comprises a lignite and/or a Leonardite and/or a Humalite.

Further example 4. A process according to further example 1, wherein the carbonaceous substance comprises a Humalite.

Further example 5. A process according to further example 1, wherein the alkaline mixture comprises water.

Further example 6. A process according to further example 1, wherein the alkaline mixture comprises a base.

Further example 7. A process according to further example 1, wherein the alkaline mixture comprises sodium hydroxide or potassium hydroxide.

Further example 8. A process according to further example 1, wherein the alkaline mixture comprises caustic potash solution.

Further example 9. A process according to further example 1, wherein the alkaline mixture comprises, by mass, between about 10 and about 15 parts water, and about 1 part caustic potash solution, wherein the caustic potash solution is 45% membrane grade.

Further example 10. A process according to further example 1, wherein the alkaline mixture comprises, by mass, about 73.7 parts water and about 5.8 parts caustic potash solution, wherein the caustic potash solution is 45% membrane grade.

Further example 11. A process according to further example 1, wherein the mass ratio of the alkaline mixture to the sample is between about 75:25 and about 84:16.

Further example 12. A process according to further example 1, wherein the mass ratio of the alkaline mixture to the sample is between about 78:22 and about 81:13.

Further example 13. A process according to further example 1, wherein the mass ratio of the alkaline mixture to the sample is about 79.5:20.5.

Further example 14. A process according to further example 1, wherein the sludge component is maintained in contact with the extraction component for between about 4 hours and about 12 hours.

Further example 15. A process according to further example 1, wherein the sludge component is maintained in contact with the extraction component for between about 6 hours and about 10 hours.

Further example 16. A process according to further example 1, wherein the sludge component is maintained in contact with the extraction component for about 8 hours.

Further example 17. A process according to further example 1, wherein the sludge component is maintained in contact with the extraction component for a period of time sufficient for the extraction component to possess a humic acid content of at least about 6%.

Further example 18. A process according to further example 1, wherein the sludge component is maintained in contact with the extraction component for a period of time sufficient for the extraction component to possess a humic acid content of at least about 14%.

Further example 19. A process according to further example 1, wherein the sludge component is maintained in contact with the extraction component for a period of time sufficient for the extraction component to possess a humic acid content of at least about 17%.

Further example 20. A process according to further example 1, wherein the sludge component is maintained in contact with the extraction component for a period of time sufficient for the extraction component to possess a humic acid content of at least about 18%.

Further example 21. A process according to further example 1, wherein the separating is effected by filtration.

Further example 22. A process according to further example 1, wherein the separating is effected by sedimentation.

Further example 23. A process according to further example 1, wherein the drying is effected by spray drying.

Further example 24. A process according to further example 1, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further example 25. A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further example 26. A process according to further example 1, wherein the plurality of humic acid enriched powder particles is characterized by a moisture content, and wherein the moisture content is between about 9% and about 15%.

Further example 27. A process according to further example 1, wherein the plurality of humic acid enriched powder particles is characterized by a moisture content, and wherein the moisture content is between about 10% and about 14%.

Further example 28. A process according to further example 1, wherein the plurality of humic acid enriched powder particles is characterized by a moisture content, and wherein the moisture content is between about 11% and about 13%.

Further example 29. A process according to further example 1, wherein the plurality of humic acid enriched powder particles is characterized by a loose bulk density, and wherein the loose bulk density is between about 28 and about 49 pounds per cubic foot.

Further example 30. A process according to further example 1, wherein the plurality of humic acid enriched powder particles is characterized by a loose bulk density, and wherein the loose bulk density is between about 31.5 and about 45.5 pounds per cubic foot.

Further example 31. A process according to further example 1, wherein the plurality of humic acid enriched powder particles is characterized by a loose bulk density, and wherein the loose bulk density is between about 35 and about 42 pounds per cubic foot.

Further example 32. A process according to further example 1, wherein the plurality of humic acid enriched powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further example 33. A process according to further example 1, wherein the rock phosphorous powder includes about 15% to about 30% phosphorous pentoxide, about 30% to about 60% calcium carbonate, and about 10% to about 20% silica.

Further example 34. A process according to further example 1, wherein the rock phosphate powder comprises about 1.0% to about 99% of the powder combination and the plurality of humic acid enriched powder particles comprises about 0.05% to about 25% of the powder combination.

Further example 35. A process according to further example 1, wherein the powder combination includes about 95.85% rock phosphate powder and about 4.15%.

Further example 36. A process according to further example 1, wherein the rock phosphorous powder and the plurality of humic acid enriched powder particles are also combined with a microbial community composition powder thereby forming a powder combination.

Further example 37. A process according to further example 36, wherein the microbial composition comprises a plurality of microorganisms in a dormant state.

Further example 38. A process according to further example 36, wherein the microbial community composition comprises a lyophilized microbial powder.

Further example 39. A process according to further example 36, wherein the microbial composition comprises a plurality of microorganisms in an endosporic state.

Further example 40. A process according to further example 36, wherein the microbial community composition includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus,* and *Trichoderma*.

Further example 41. A process according to example 36, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata,* and/or *Pseudomonas aeruginosa*.

Further example 42. A process according to example 36, wherein the microbial community composition includes at least one methylotrophic species. Methylotrophs are a diverse group of microorganisms (including both bacteria and yeast) that may metabolize and use reduced one-carbon compounds (e.g. methanol or methane) as their carbon source. Methylotrophs may also use multi-carbon compositions containing no carbon-carbon bonds (e.g. dimethyl ether, dimethylamine, etc.). Methylotrophs are key players in the carbon cycle, uptaking methane and other greenhouse gases. Additionally, methylotrophs are capable of forming mutualistic relationships with several plant species, and providing provide plants nutrients, such as soluble phosphorus and fixed nitrogen.

Further example 43. A process according to further example 36, wherein the microbial community composition comprises about 0.0025% to about 10% of the powder combination.

Further example 44. A process according to further example 36, wherein the powder combination includes about 93.75% rock phosphate powder, about 3.75% hydrolyzed humic acid enriched powder, and about 2.5% dormant microbial community composition powder.

Further example 45. A process according to further example 36, wherein the rock phosphorous powder, the plurality of humic acid enriched powder particles, and microbial community composition powder are also combined with a zinc sulfate powder thereby forming a powder combination.

Further example 46. A process according to further example 45, wherein the zinc sulfate powder comprises about 0.01% to about 50% of the powder combination.

Further example 47. A process according to further example 45, wherein the powder combination includes about 95.795% rock phosphate powder, about 4.15% hydrolyzed humic acid enriched powder, about 0.005% dormant microbial community composition powder, and about 0.05% zinc sulfate powder.

Further example 48. A process according to further example 1, 36, or 45, wherein the compacting of the powder combination is effected by an apparatus comprising a roller compactor.

Further example 49. A process according to further example 1, 36, or 45, wherein the compacting is effected by an apparatus comprising a roller compactor, and wherein the speed of the roller compactor is about 8 rpm.

Further example 50. A process according to further example 1, 36, or 45, wherein the compacting is effected by an apparatus comprising a roller compactor, and wherein the pressure exerted by the roller compactor is about 1700 psi.

Further example 51. A process according to further example 1, 36, or 45, wherein the compacting is effected by an apparatus comprising a roller compactor, wherein the speed of the roller compactor is about 8 rpm, and wherein the pressure exerted by the roller compactor is about 1700 psi.

Further example 52. A process according to further example 1, 36, or 45, wherein the compacting is effected by an apparatus comprising a roller compactor, wherein the speed of the roller compactor is about 8 rpm, wherein the pressure exerted by the roller compactor is about 1700 psi, and wherein the temperature does not exceed about 130 degrees Fahrenheit.

Further example 53. A process according to further example 36 or 45, wherein the compacting conditions do not denature at least a portion of the microbial community composition.

Further example 54. A process according to further example 36 or 45, wherein at least a portion of the microbial community composition within the semi-soluble granule is dormant and may be rehydrated to resume non-dormant metabolic activities.

Further exampled 55. A process according to further example 36 or 45, wherein at least about 80% of the microbial community composition is incorporated into the semi-soluble granule.

Further exampled 56. A process according to further example 36 or 45, wherein at least about 90% of the microbial community composition is incorporated into the semi-soluble granule.

Further exampled 57. A process according to further example 36 or 45, wherein at least about 95% of the microbial community composition is incorporated into the semi-soluble granule.

Further exampled 58. A process according to further example 36 or 45, wherein at least about 99% of the microbial community composition is incorporated into the semi-soluble granule.

Further exampled 59. A process according to further example 36 or 45, wherein 100% of the microbial community composition is incorporated into the semi-soluble granule.

Further example 60. A process according to further example 1, 36, or 45 wherein the semi-soluble granule is between about 0.5 mm and about 4.5 mm.

Further example 61. A process according to further example 1, 36, or 45 wherein the semi-soluble granule is between about 0.8 mm and about 4.0 mm.

Further example 62. A process according to further example 1, 36, or 45 wherein the semi-soluble granule is between about 0.8 mm and about 2.0 mm.

Further example 63. A process according to further example 1, 36, or 45 wherein the semi-soluble granule is between about 2.1 mm and about 4.0 mm.

Further example 64. A process according to further example 36, or 45 wherein the microbial community composition, the humic acid enriched powder, and/or the zin sulfate components of the granule may be fully soluble in water when the granule is submerged in one liter of water at a temperature of 25 degrees Celsius, but the rock phosphate component of the granule may not be soluble in in the water.

Further example 65. A process according to further example 1, 36, or 45 wherein the process further includes solubilizing the semi-soluble granule, thereby forming a partially solubilized solution and applying the partially solubilized solution to a desired location.

Further example 66. A process according to further example 1, 36, or 45 wherein the process further includes applying the semi-soluble granule to a desired location.

Further example 67. A process for making a semi-soluble granule comprising a rock phosphate, humic acid composition, and a microbial community composition the process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of humic acid enriched powder particles;

combining a rock phosphorous powder, the plurality of humic acid enriched powder particles, and a microbial community composition powder thereby forming a powder combination; and     compacting at least a portion of the powder combination under conditions wherein the at least a portion of the powder combination, as a result of the compacting, are made into a form of a granule;

thereby making a semi-soluble granule comprising the rock phosphate, humic acid, and microbial community composition.

Further example 68. A process for making a semi-soluble granule comprising a rock phosphate, humic acid composition, a microbial community composition, and zinc sulfate the process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of humic acid enriched powder particles;

combining a rock phosphorous powder, the plurality of humic acid enriched powder particles, a microbial community composition powder, and a zinc sulfate powder thereby forming a powder combination; and compacting at least a portion of the powder combination under conditions wherein the at least a portion of the powder combination, as a result of the compacting, are made into a form of a granule;

thereby making a semi-soluble granule comprising the rock phosphate, humic acid, microbial community composition, and zinc sulfate.

Aspects of a semi-soluble composite granule such as is described in various embodiments herein are further illustrated by the following further examples, which are set forth to illustrate certain aspects of a process such as is described in various embodiments herein and are not to be construed as limiting thereof.

Further example 69. A semi-soluble composite granule comprising a rock phosphate and humic acid the granule made by a process comprising:

obtaining a sample of a carbonaceous substance comprising humic acid and one or more other substances;

contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of humic acid enriched powder particles;

combining a rock phosphorous powder and the plurality of humic acid enriched powder particles, thereby forming a powder combination; and compacting at least a portion of the powder combination under conditions wherein the at least a portion of the powder combination, as a result of the compacting, are made into a form of a granule;

thereby making a semi-soluble granule comprising the rock phosphate and humic acid.

Further example 70. A granule according to further example 69, wherein the carbonaceous substance comprises a coal and/or a claystone and/or a mudstone and/or a shale.

Further example 71. A semi-soluble granule according to further example 69, wherein the carbonaceous substance comprises a lignite and/or a Leonardite and/or a Humalite.

Further example 72. A semi-soluble granule according to further example 69, wherein the carbonaceous substance comprises a Humalite.

Further example 73. A semi-soluble granule according to further example 69, wherein the alkaline mixture comprises water.

Further example 74. A semi-soluble granule according to further example 69, wherein the alkaline mixture comprises a base.

Further example 75. A semi-soluble granule according to further example 69, wherein the alkaline mixture comprises sodium hydroxide or potassium hydroxide.

Further example 76. A semi-soluble granule according to further example 69, wherein the alkaline mixture comprises caustic potash solution.

Further example 77. A semi-soluble granule according to further example 69, wherein the alkaline mixture comprises, by mass, between about 10 and about 15 parts water, and about 1 part caustic potash solution, wherein the caustic potash solution is 45% membrane grade.

Further example 78. A semi-soluble granule according to further example 69, wherein the alkaline mixture comprises, by mass, about 73.7 parts water and about 5.8 parts caustic potash solution, wherein the caustic potash solution is 45% membrane grade.

Further example 79. A semi-soluble granule according to further example 69, wherein the mass ratio of the alkaline mixture to the sample is between about 75:25 and about 84:16.

Further example 80. A semi-soluble granule according to further example 69, wherein the mass ratio of the alkaline mixture to the sample is between about 78:22 and about 81:13.

Further example 81. A semi-soluble granule according to further example 69, wherein the mass ratio of the alkaline mixture to the sample is about 79.5:20.5.

Further example 82. A semi-soluble granule according to further example 69, wherein the sludge component is maintained in contact with the extraction component for between about 4 hours and about 12 hours.

Further example 83. A semi-soluble granule according to further example 69, wherein the sludge component is maintained in contact with the extraction component for between about 6 hours and about 10 hours.

Further example 84. A semi-soluble granule according to further example 69, wherein the sludge component is maintained in contact with the extraction component for about 8 hours.

Further example 85. A semi-soluble granule according to further example 69, wherein the sludge component is maintained in contact with the extraction component for a period of time sufficient for the extraction component to possess a humic acid content of at least about 6%.

Further example 86. A semi-soluble granule according to further example 69, wherein the sludge component is maintained in contact with the extraction component for a period of time sufficient for the extraction component to possess a humic acid content of at least about 14%.

Further example 87. A semi-soluble granule according to further example 69, wherein the sludge component is maintained in contact with the extraction component for a period of time sufficient for the extraction component to possess a humic acid content of at least about 17%.

Further example 88. A semi-soluble granule according to further example 69, wherein the sludge component is maintained in contact with the extraction component for a period of time sufficient for the extraction component to possess a humic acid content of at least about 18%.

Further example 89. A semi-soluble granule according to further example 69, wherein the separating is effected by filtration.

Further example 90. A semi-soluble granule according to further example 69, wherein the separating is effected by sedimentation.

Further example 91. A semi-soluble granule according to further example 69, wherein the drying is effected by spray drying.

Further example 92. A semi-soluble granule according to further example 69, wherein the drying is effected by spray drying, and wherein the spray drying is characterized by an inlet temperature and an outlet temperature, and wherein the inlet temperature passing through a burner heats to between about 400 degrees and about 800 degrees Fahrenheit, and wherein the outlet temperature is between about 150 degrees Fahrenheit and about 250 degrees Fahrenheit.

Further example 93. A semi-soluble granule according to further example 69, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further example 94. A semi-soluble granule according to further example 69, wherein the plurality of humic acid enriched powder particles is characterized by a moisture content, and wherein the moisture content is between about 9% and about 15%.

Further example 95. A semi-soluble granule according to further example 69, wherein the plurality of humic acid enriched powder particles is characterized by a moisture content, and wherein the moisture content is between about 10% and about 14%.

Further example 96. A semi-soluble granule according to further example 69, wherein the plurality of humic acid enriched powder particles is characterized by a moisture content, and wherein the moisture content is between about 11% and about 13%.

Further example 97. A semi-soluble granule according to further example 69, wherein the plurality of humic acid enriched powder particles is characterized by a loose bulk density, and wherein the loose bulk density is between about 28 and about 49 pounds per cubic foot.

Further example 98. A semi-soluble granule according to further example 69, wherein the plurality of humic acid enriched powder particles is characterized by a loose bulk density, and wherein the loose bulk density is between about 31.5 and about 45.5 pounds per cubic foot.

Further example 99. A semi-soluble granule according to further example 69, wherein the plurality of humic acid enriched powder particles is characterized by a loose bulk density, and wherein the loose bulk density is between about 35 and about 42 pounds per cubic foot.

Further example 100. A semi-soluble granule according to further example 69, wherein the plurality of humic acid enriched powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further example 101. A semi-soluble granule according to further example 69, wherein the rock phosphorous powder includes about 15% to about 30% phosphorous pentoxide, about 30% to about 60% calcium carbonate, and about 10% to about 20% silica.

Further example 102. A semi-soluble granule according to further example 69, wherein the rock phosphate powder comprises about 1.0% to about 99% of the powder combination and the plurality of humic acid enriched powder particles comprises about 0.05% to about 25% of the powder combination.

Further example 103. A semi-soluble granule according to further example 69, wherein the powder combination includes about 95.85% rock phosphate powder and about 4.15%.

Further example 104. A semi-soluble granule according to further example 69, wherein the rock phosphorous powder and the plurality of humic acid enriched powder particles are also combined with a microbial community composition powder thereby forming a powder combination.

Further example 105. A semi-soluble granule according to further example 104, wherein the microbial composition comprises a plurality of microorganisms in a dormant state.

Further example 106. A semi-soluble granule according to further example 104, wherein the microbial community composition comprises a lyophilized microbial powder.

Further example 107. A semi-soluble granule according to further example 104, wherein the microbial composition comprises a plurality of microorganisms in an endosporic state.

Further example 108. A semi-soluble granule according to further example 104, wherein the microbial community composition includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus,* and *Trichoderma*.

Further example 109. A semi-soluble granule according to further example 104, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata,* and/or *Pseudomonas aeruginosa*.

Further example 110. A semi-soluble granule according to further example 104, wherein the microbial community composition includes at least one methylotrophic species.

Further example 111. A semi-soluble granule according to further example 104, wherein the microbial community composition comprises about 0.0025% to about 10% of the powder combination.

Further example 112. A semi-soluble granule according to further example 104, wherein the powder combination includes about 93.75% rock phosphate powder, about 3.75% hydrolyzed humic acid enriched powder, and about 2.5% dormant microbial community composition powder.

Further example 113. A semi-soluble granule according to further example 104, wherein the rock phosphorous powder, the plurality of humic acid enriched powder particles, and microbial community composition powder are also combined with a zinc sulfate powder thereby forming a powder combination.

Further example 114. A semi-soluble granule according to further example 104, wherein the zinc sulfate powder comprises about 0.01% to about 50% of the powder combination.

Further example 115. A semi-soluble granule according to further example 104, wherein the powder combination includes about 95.795% rock phosphate powder, about 4.15% hydrolyzed humic acid enriched powder, about 0.005% dormant microbial community composition powder, and about 0.05% zinc sulfate powder.

Further example 116. A semi-soluble granule according to further example 69, 104, or 113, wherein the compacting is effected by an apparatus comprising a roller compactor.

Further example 117. A semi-soluble granule according to further example 69, 104, or 113, wherein the compacting is effected by an apparatus comprising a roller compactor, and wherein the speed of the roller compactor is about 8 rpm.

Further example 118. A semi-soluble granule according to further example 69, 104, or 113, wherein the compacting is effected by an apparatus comprising a roller compactor, and wherein the pressure exerted by the roller compactor is about 1700 psi.

Further example 119. A semi-soluble granule according to further example 69, 104, or 113, wherein the compacting is effected by an apparatus comprising a roller compactor, wherein the speed of the roller compactor is about 8 rpm, and wherein the pressure exerted by the roller compactor is about 1700 psi.

Further example 120. A semi-soluble granule according to further example 69, 104, or 113, wherein the compacting is effected by an apparatus comprising a roller compactor, wherein the speed of the roller compactor is about 8 rpm, wherein the pressure exerted by the roller compactor is about 1700 psi, and wherein the temperature does not exceed about 130 degrees Fahrenheit.

Further example 121. A semi-soluble granule according to further example 104 or 113, wherein the compacting conditions do not denature at least a portion of the microbial community composition.

Further example 122. A semi-soluble granule according to further example 104 or 113, wherein at least a portion of the microbial community composition within the granule is dormant and may be rehydrated for use.

Further exampled 123. A semi-soluble granule according to further example 104 or 113, wherein at least about 80% of the microbial community composition is incorporated into the granule.

Further exampled 124. A semi-soluble granule according to further example 104 or 113, wherein at least about 90% of the microbial community composition is incorporated into the granule.

Further exampled 125. A semi-soluble granule according to further example 104 or 113, wherein at least about 95% of the microbial community composition is incorporated into the granule.

Further exampled 126. A semi-soluble granule according to further example 104 or 113, wherein at least about 99% of the microbial community composition is incorporated into the granule.

Further exampled 127. A semi-soluble granule according to further example 104 or 113, wherein 100% of the microbial community composition is incorporated into the granule.

Further example 128. A semi-soluble granule according to further example 69, 104, or 113, wherein the granule is between about 0.5 mm and about 4.5 mm.

Further example 129. A semi-soluble granule according to further example 69, 104, or 113, wherein the granule is between about 0.8 mm and about 4.0 mm.

Further example 130. A semi-soluble granule according to further example 69, 104, or 113, wherein the granule is between about 0.8 mm and about 2.0 mm.

Further example 131. A semi-soluble granule according to further example 69, 104, or 113, wherein the granule is between about 2.1 mm and about 4.0 mm.

Further example 132. A semi-soluble granule according to further example 104, wherein the microbial community composition and the humic acid enriched powder components of the granule may be fully soluble in water when the granule is submerged in one liter of water at a temperature of 25 degrees Celsius, but the rock phosphate component of the granule may be only semi-soluble in in the water.

Further example 133. A semi-soluble granule according to further example 113, wherein the zinc sulfate, microbial community composition, and the humic acid enriched powder components of the granule may be fully soluble in water when the granule is submerged in one liter of water at a temperature of 25 degrees Celsius, but the rock phosphate component of the granule may be only semi-soluble in in the water.

Further example 134. A semi-soluble granule according to further example 69, 104, or 113, wherein the process further includes solubilizing the semi-soluble granule, thereby forming a partially solubilized solution and applying the partially solubilized solution to a desired location.

Further example 135. A semi-soluble granule according to further example 69, 104, or 113, wherein the process further includes applying the semi-soluble granule to a desired location.

Aspects of a semi-soluble composite granule comprising rock phosphate, and humic acid and/or a microbial community composition and/or zinc sulfate such as is described in various embodiments herein are further illustrated by the following further example, which is set forth to illustrate certain aspects of the granule as is described in various embodiments herein and are not to be construed as limiting thereof.

Further example 136. A semi-soluble composite granule comprising:
    a homogenous powder comprising
        a rock phosphate powder comprising about 1% to about 99% of the homogenous powder, and
        a hydrolyzed humic acid enriched powder comprising about 0.05% to about 25% of the homogenous powder,
    wherein the homogenous powder is granulated to form a semi-soluble composite granule; and
    wherein the composite granule is between about 0.8 mm and about 4.0 mm in diameter.

Further example 137. A composite granule according to further example 136, wherein the rock phosphorous powder includes about 15% to about 30% phosphorous pentoxide, about 30% to about 60% calcium carbonate, and about 10% to about 20% silica.

Further example 138. A composite granule according to further example 136, wherein the powder combination includes about 95.85% rock phosphate powder and about 4.15% hydrolyzed humic acid enriched powder.

Further example 139. A composite granule according to further example 136, wherein the homogenous powder combination further includes a dormant microbial community composition powder comprising about 0.0025% to about 10% of the homogenous powder.

Further example 140. A composite granule according to further example 139, wherein the powder combination includes about 93.75% rock phosphate powder, about 3.75% hydrolyzed humic acid enriched powder, and about 2.5% dormant microbial community composition powder.

Further example 141. A composite granule according to further example 139, wherein the plurality of dormant microbial organisms includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus*, and *Trichoderma*.

Further example 142. A composite granule according to further example 139, wherein the microbial community composition includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata*, and/or *Pseudomonas aeruginosa*.

Further example 143. A composite granule according to further example 139, wherein the microbial community composition includes at least one methylotrophic species.

Further example 144. A composite granule according to further example 139, wherein the microbial community composition powder includes a lyophilized microbial powder.

Further example 145. A composite granule according to further example 139, wherein at least of a portion of the plurality of dormant microbial organisms within the composite granule may be rehydrated for use.

Further example 146. A composite granule according to further example 139, wherein the homogenous powder combination further includes a zinc sulfate powder comprising about 0.001% to about 50% of the homogenous powder.

Further example 147. A composite granule according to further example 146, wherein the powder combination includes about 95.795% rock phosphate powder, about 4.15% hydrolyzed humic acid enriched powder, about 0.005% dormant microbial community composition powder, and about 0.05% zinc sulfate powder.

Further example 148. A composite granule according to further example 136, 139, or 146, wherein the composite granule is between about 0.5 mm and about 4.5 mm.

Further example 149. A composite granule according to further example 136, 139, or 146, wherein the composite granule is between about 0.8 mm and about 4.0 mm.

Further example 150. A composite granule according to further example 136, 139, or 146, wherein the composite granule is between about 0.8 mm and about 2.0 mm.

Further example 151. A composite granule according to further example 136, 139, or 146, wherein the composite granule is between about 2.1 mm and about 4.0 mm.

Further example 152. A composite granule according to further example 139 or 146, wherein the microbial community composition and the humic acid enriched powder components of the granule may be fully soluble in water when the granule is submerged in one liter of water at a temperature of 25 degrees Celsius, but the rock phosphate component of the granule may not be soluble in in the water.

Further example 153. A composite granule according to further example 146, wherein the zinc sulfate, the microbial community composition, and the humic acid enriched powder components of the granule may be fully soluble in water when the granule is submerged in one liter of water at a temperature of 25 degrees Celsius, but the rock phosphate component of the granule may not be soluble in in the water.

Figure 1A:
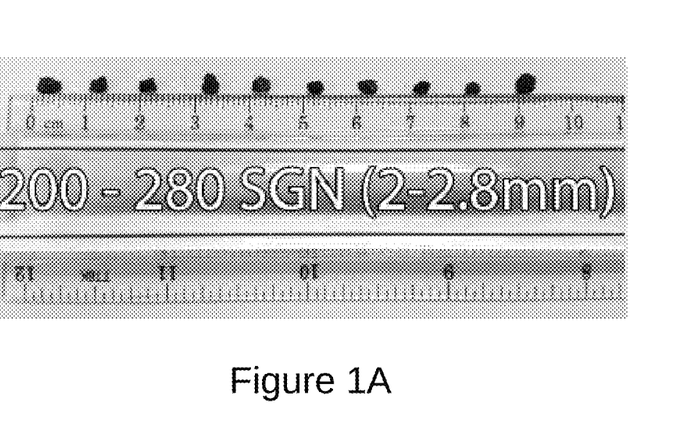
FIGS. 1A-B are photographic illustrations of an embodiment of semi-soluble granules described herein.
Figure 1B:
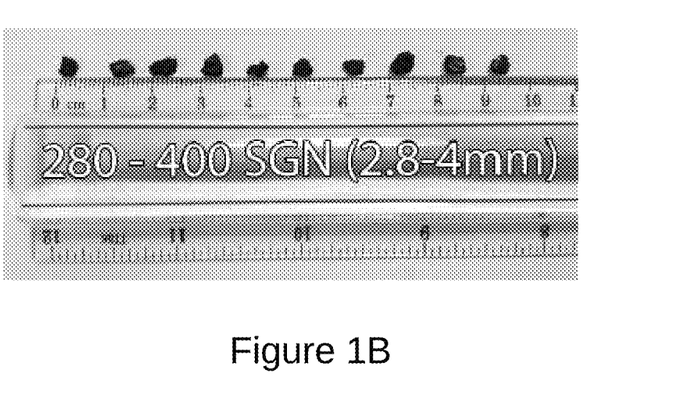
Figure 2A:
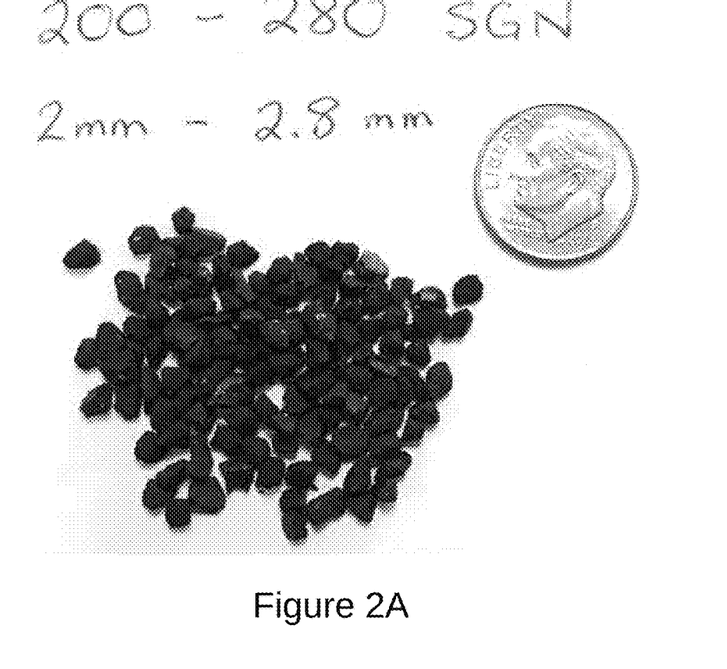
FIGS. 2A-2B are photographic illustrations of embodiments of semi-soluble granules described herein.
Figure 2B:
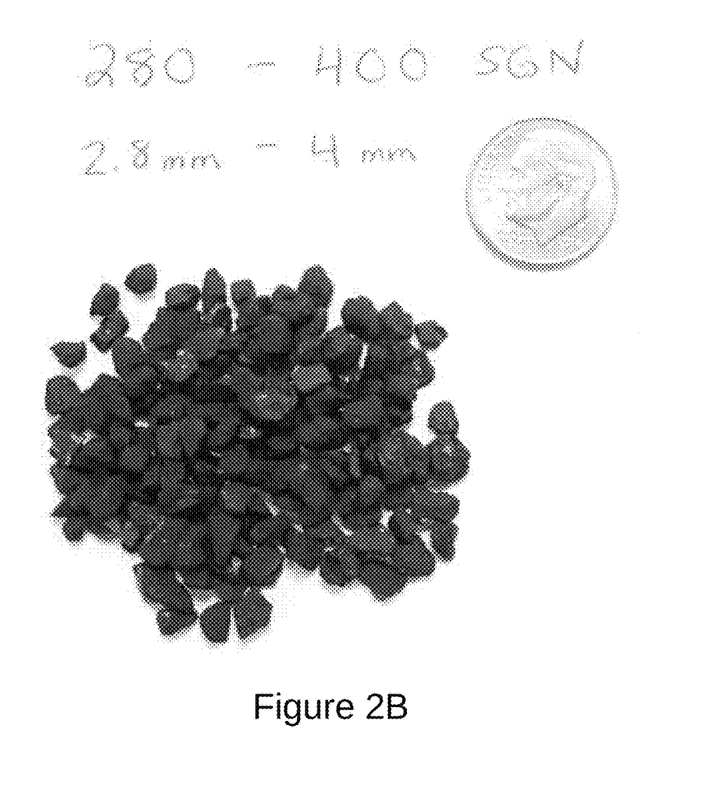

Further example 154. A plurality of composite granules according to further example 136, 139, or 146 are illustrated in FIGS. 1A-B and 2A-B. As evident by FIGS. 1A-B and 2A-B the composite granules may generally vary in shape and size. In FIGS. 1A-B a plurality of composite granules are disposed along a ruler in order to illustrate their size. FIG. 1A illustrates composite granules ranging from about 2.0 mm to about 2.8 mm in diameter; FIG. 1B illustrates composite granules ranging from about 2.8 mm to about 4.0 mm. FIGS. 2A-B illustrate composite granules ranging from about 2.0 mm to about 2.8 mm in diameter and about 2.8 mm to about 4.0 mm in diameter, respectively, using a United States dime for reference that has a standard diameter of 17.9 mm.

Further example 155. A plurality of composite granules according to further example 136, 139, or 146 were subjected to crush strength testing. A total of ten (10) replicates of crush strength testing were conducted, with Table 1 illustrating the results for the composite granules ranging about 2.0 to about 4.0 mm in diameter. SGN, or Size Guide Number is a standard measurement of the diameter, as expressed in millimeters×100, of granules based on the median within the batch. As illustrated in Table 1, the crush strength measurements of the composite granules ranging from about 2.0 to 4.0 mm in diameter range from about 0.1 psi to about 8.0 psi. The average crush strength of the composite granules ranging from about 2.0 to 4.0 mm in diameter is about 3.8 psi. However, it is to be understood that these examples are for illustrative purposes only and are non-limiting, in some instances the crush strength of a composite granule consistent with the description herein may range anywhere from 0.1 psi to 10 psi.

TABLE 1

| SGN | % Vol. | Avg. SGN | CT 1 | CT 2 | CT 3 | CT 4 | CT 5 | CT 6 | CT 7 | CT 8 | CT 9 | CT 10 |
|---|---|---|---|---|---|---|---|---|---|---|---|---|
| 280-340-400 | 75% | 339 | 1.0 | 4.5 | 8.0 | 2.5 | 6.5 | 3.0 | 3.5 | 3.0 | 6.0 | 5.0 |
| 200-240-280 | 25% |  | 3.5 | 2.0 | 2.5 | 2.5 | 1.5 | 0.0 | 0.0 | 0.0 | 3.5 | 1.0 |
| 140-170-200 | 0.0% |  | — | — | — | — | — | — | — | — | — | — |

TABLE 1-continued

| SGN | % Vol. | Avg. SGN | CT 1 | CT 2 | CT 3 | CT 4 | CT 5 | CT 6 | CT 7 | CT 8 | CT 9 | CT 10 |
|---|---|---|---|---|---|---|---|---|---|---|---|---|
| 100-120-140 | 0.0% | | — | — | — | — | — | — | — | — | — | — |
| 60-80-100 | 0.0% | | — | — | — | — | — | — | — | — | — | — |

Further example 156. A composite granule according to further example 136, 139, or 146, wherein the composite granule is solubilized thereby forming a partially solubilized solution and applying the partially solubilized solution to a desired location.

Further example 157. A composite granule according to further example 136, 139, or 146, wherein the composite granule is applied to a desired location, such as agricultural soil. The rate at which the composite granules are applied to a desired location may be dependent on hydrolyzed humic acid enriched powder composition; for example, the application rate of the composite granule may be determined based on the hydrolyzed humic acid portion of the composite granule having an application rate of about 2 lbs. to about 10 lbs. per acre. The following application examples, assume the hydrolyzed humic acid enriched powder comprises about 3.75% of the homogenous powder (for example 75 lbs. per ton). In a first example, the composite granules described herein may be applied to a wheat, barley, corn, newly seeded alfalfa, pulse, or potato crop at about 55 lbs. to about 110 lbs. per acre when applied in furrow; however, when broadcast on wheat, barley, corn, newly seeded alfalfa, pulse, or potato crops the application rate may be about 55 lbs. to about 250 lbs. per acre. In a second example, the composite granules described herein may be broadcast on an established alfalfa crop at a rate of about 55 lbs. to about 250 lbs. per acre, and may be repeated approximately every 35 days after cutting. In a third example, the composite granules described herein may be applied to an established grass hay or pasture at a rate of about 55 lbs. to about 250 lbs. per acre, and may be repeated approximately every 35 days after cutting. Where the composite granule includes a microbial community composition, the application rate may, in some instances, vary slightly based on the effective use rate of the dormant microbial organisms.

Further example 158. A semi-soluble composite granule comprising:
a homogenous powder comprising
a rock phosphate powder comprising about 25% to about 95% of the homogenous powder,
a hydrolyzed humic acid enriched powder comprising about 3.75% to about 25% of the homogenous powder, and
a dormant microbial community composition powder comprising about 0.5% to about 5% of the homogenous powder;
wherein the homogenous powder is granulated to form a semi-soluble composite granule; and
wherein the composite granule is between about 0.8 mm and about 4.0 mm in diameter.

Further example 159. A semi-soluble composite granule comprising:
a homogenous powder comprising
a rock phosphate powder comprising about 1% to about 99% of the homogenous powder,
a hydrolyzed humic acid enriched powder comprising about 0.05% to about 25% of the homogenous powder,
a dormant microbial community composition powder comprising about 0.0025% to about 10% of the homogenous powder,
a zinc sulfate powder comprising about 0.01% to about 50% of the homogenous powder;
wherein the homogenous powder is granulated to form a semi-soluble composite granule; and
wherein the composite granule is between about 0.8 mm and about 4.0 mm in diameter.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:
1. A semi-soluble composite granule comprising:
a homogenous powder comprising
a rock phosphate powder comprising about 85% to about 99% of the homogenous powder,
a hydrolyzed humic acid enriched powder comprising about 0.05% to about 15% of the homogenous powder, and
wherein the homogenous powder is granulated to form a semi-soluble composite granule; and
wherein the composite granule is between about 0.8 mm and about 4.0 mm in diameter.
2. The composite granule of claim 1, wherein the rock phosphate powder comprises:
about 15% to about 30% phosphorus pentoxide;
about 30% to about 60% calcium carbonate; and
about 10% to about 20% silica.
3. The composite granule of claim 1, wherein the homogenous powder includes:
about 95.85% rock phosphate powder; and
about 4.15% hydrolyzed humic acid enriched powder.
4. The composite granule of claim 1, wherein the homogenous powder further includes a dormant microbial community composition powder comprising about 0.0025% to about 10% of the homogenous powder.
5. The composite granule of claim 4, wherein the homogenous powder includes:
about 93.75% rock phosphate powder,
about 3.75% hydrolyzed humic acid enriched powder, and
about 2.5% dormant microbial community composition powder.

6. The composite granule of claim 4, wherein the dormant microbial community composition powder includes at least one methylotrophic microbial species.

7. The composite granule of claim 4, wherein the dormant microbial community composition powder includes at least one species selected from the group of genera consisting of: *Acetobacter, Agrobacterium, Aquifex, Arthrobacter, Azoarcus, Azorhizobium, Azospirillum, Azotobacter, Bacillus, Beijerinckia, Burkholderia, Chlorobium, Chloroflexus, Chryseobacterium, Enterococcus, Escherichia, Flavobacterium, Flexibacter, Frankia, Gloeobacter, Gluconacetobacter, Halobacterium, Herbaspirillum, Lactobacillus, Leptonema, Mycobacterium, Paenibacillus, Phyllobacterium, Planctomyces, Pseudomonas, Rhizobia, Rhizobium, Rickettsia, Rhodocyclus, Sinorhizobium, Sphingomonas, Streptomyces, Synechococcus Thermotoga, Thermus*, and *Trichoderma*.

8. The composite granule of claim 7, wherein the dormant microbial community composition powder includes at least one of *Bacillus megaterium, Bacillus linchenformis, Bacillus amyloliquefaciens, Bacillus methylotrophicus, Bacillus pumilus, Pseudomonas flourescens, Pseudomonas putida, Pseudomonas striata*, and/or *Pseudomonas aeruginosa*.

9. The composite granule of claim 4, wherein the microbial community composition powder includes a lyophilized microbial powder.

10. The composite granule of claim 1, wherein the composite granule is between about 0.8 mm and about 2.0 mm in diameter.

11. The composite granule of claim 1, wherein the composite granule is between about 2.0 mm and about 4.0 mm in diameter.

12. The composite granule of claim 4, wherein the homogenous powder further includes a zinc sulfate powder comprising about 0.01% to about 50% of the homogenous powder.

13. The composite granule of claim 12, wherein the homogenous powder includes:
about 95.795% rock phosphate powder,
about 4.15% hydrolyzed humic acid enriched powder,
about 0.005% dormant microbial community composition powder, and
about 0.05% zinc sulfate powder.

14. A semi-soluble composite granule comprising:
a homogenous powder comprising
  a rock phosphate powder comprising about 85% to about 95% of the homogenous powder,
  a hydrolyzed humic acid enriched powder comprising about 3.75% to about 15% of the homogenous powder, and
  a dormant microbial community composition powder comprising about 0.5% to about 5% of the homogenous powder;
wherein the homogenous powder is granulated to form a semi-soluble composite granule; and
wherein the composite granule is between about 0.8 mm and about 4.0 mm in diameter.

15. A semi-soluble composite granule comprising:
a homogenous powder comprising
  a rock phosphate powder comprising about 1% to about 99% of the homogenous powder,
  a hydrolyzed humic acid enriched powder comprising about 0.05% to about 25% of the homogenous powder,
  a dormant microbial community composition powder comprising about 0.0025% to about 10% of the homogenous powder, and
  a zinc sulfate powder comprising about 0.01% to about 50% of the homogenous powder;
wherein the homogenous powder is granulated to form a semi-soluble composite granule; and
wherein the composite granule is between about 0.8 mm and about 4.0 mm in diameter.

* * * * *